United States Patent
Si et al.

(10) Patent No.: US 7,338,096 B2
(45) Date of Patent: Mar. 4, 2008

(54) PRESS-TYPE LATCH DEVICE

(75) Inventors: Shu-Kun Si, Taipei (TW); Tien-Chang Lin, Taipei (TW)

(73) Assignee: Inventec Corporation (TW)

( * ) Notice: Subject to any disclaimer, the term of this patent is extended or adjusted under 35 U.S.C. 154(b) by 72 days.

(21) Appl. No.: 11/269,927

(22) Filed: Nov. 8, 2005

(65) Prior Publication Data

US 2006/0281358 A1 Dec. 14, 2006

(30) Foreign Application Priority Data

Jun. 8, 2005 (TW) .............................. 94209521 U

(51) Int. Cl.
*E05C 1/02* (2006.01)
(52) U.S. Cl. ................. 292/137; 292/341.15; 292/152; 292/87
(58) Field of Classification Search ............... 292/137, 292/DIG. 38, DIG. 16, DIG. 37, DIG. 40, 292/341.15, 341.17, 152, 80, 87
See application file for complete search history.

(56) References Cited

U.S. PATENT DOCUMENTS

| | | | | |
|---|---|---|---|---|
| 906,452 | A | * | 12/1908 | McCleer ..................... 292/128 |
| 4,597,599 | A | * | 7/1986 | Bisbing ..................... 292/174 |
| 6,607,224 | B2 | * | 8/2003 | Hodges ..................... 292/303 |

* cited by examiner

*Primary Examiner*—Jennifer H. Gay
*Assistant Examiner*—Mark Williams
(74) *Attorney, Agent, or Firm*—Peter F. Corless; Steven M. Jensen; Edwards Angell Palmer & Dodge LLP

(57) ABSTRACT

A press-type latch device for establishing latched and unlatched states with a hook includes: a press member having a press portion and connection portions extending from the press portion; and a spring member having a bottom portion and first and second latch arms extending from the bottom portion. A latch space is formed between the first and second latch arms to allow the hook to enter into the latch space and engage with at least one of the latch arms. The spring member has insertion holes formed on the first latch arm to allow the connection portions to pass through and abut against the second latch arm, when pressing the press portion, the second latch arm is pushed away from the first latch arm by the abutting connection portions, thereby unlatching the hook from the latch space.

16 Claims, 6 Drawing Sheets

PRESS-TYPE LATCH DEVICE

FIELD OF THE INVENTION

The present invention relates to a latch device, and more particularly to a press-type latch device applied to notebook computers.

THE PRIOR ART

Computers have become widely used devices, and notebook computers are particularly preferred by users because of their portability. By using a notebook computer, one can access information whenever it is needed. However, in addition to considerations given to technical factors such as hardware and software during the design process, designers need to take user-friendly operation into account.

A notebook computer mainly includes a base and a pivotally attached lid which is connected to the base by a hinge. To operate a notebook computer, the lid is first rotated open to not only expose a display screen for display output but also a keyboard and/or a touch pad connected with the notebook computer used for input; after use, the lid is closed on the base such that the notebook computer compacts for storage and the screen is protected. In order to secure the lid and the base in the closed position, a latch device is provided between them. Accordingly, employing a latch device that is easy to latch and unlatch the lid from the base is an important usability factor for a designer.

FIG. 1 shows a prior-art latch device which can be mounted at the front edge of the lid of a notebook computer to latch and unlatch the lid from the base. The latch device includes a latch member 1 and a push-spring member 2, wherein the latch member 1 includes a slender main body 10, a pair of hooks 11 extending in the same direction from the main body 10, and a block 12 placed between the two hooks 11 and exposed at the front edge of the lid. Users slide the block 12 to allow the whole latch member 1 to move horizontally. The push spring member 2 is mounted to one side of the latch member 1 to move the latch member 1 back to original position after the lid and the base are latched or unlatched.

However, in order to open the above notebook computer, a user usually needs to place the notebook computer on a table or a level surface. Then, the user must laterally slide the block 12 of the latch member 1 with one hand to move the hooks 11 away from a restrictive barrier, and, at the same time, lift the lid with the other hand to unlatch the lid from the base. As a result of these three requirements, it is difficult or impossible for a person walking, a handicapped person with restricted use of one or both hands, or a person with one hand occupied to smoothly and readily open a notebook computer equipped so.

In addition, even if the latch member 1 is released, the lid is still resting on the base. Therefore, users who try to lift the lid can only exert force on the edges or corners of the lid, thus rendering it arduous to lift the lid.

As a result, it is desirable to provide a latch device that can be applied to a notebook computer that avoids the shortcomings of the prior art such as the difficulty often encountered in lifting the lid having a display.

SUMMARY OF THE INVENTION

In view of the shortcomings of the above prior art, the primary objective of the present invention is to provide a press-type latch device, wherein pressing the latch device with only one hand can unlatch the lid from the base of a notebook computer, thereby facilitating operation and enhancing operability.

Another objective of the present invention is to provide a press-type latch device, wherein pressing the latch device can automatically separate the lid from the base of a notebook computer, thereby facilitating easy opening of the lid.

To achieve the above and other objectives, the present invention discloses a press-type latch device used to establish latch and unlatch states in conjunction with a hook. The press-type latch device includes a press member having a press portion, at least a connection portion and at least a positioning portion extending from the press portion; and a spring member having a bottom portion and first and second latch arms extending in the same direction from the bottom portion. A latch space is formed between the first and second latch arms to allow the hook to enter into the latch space and engage with at least one latch arm. The spring member having insertion holes at least formed at suitable places of the first latch arm to allow the one or more connection portions of the press member to pass through the insertion holes of the first latch arm to abut against the second latch arm, whereby pressing the press portion causing the one or more connection portions to incline the second latch arm of the spring member away from the first latch arm, thereby increasing the latch space so as to unlatch the hook engaged therein.

The press-type latch device of the present invention can attain an unlatched state with the hook by pressing the latch device with one hand, which facilitates ease of operation for users. In addition, the lid and the base of a notebook computer can be automatically separated by pressing the latch device, that is, the lid is opened at a certain angle to the base, thereby making it easier to open the lid.

PREFFERED EMBODIMENTS OF THE INVENTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded with the widest scope consistent with the principles and features described herein. And it should be noted that all the drawings are simplified diagrams showing only the basic construction of the present invention. Thus they only show compositions related to the present invention and the shown compositions are not drawn according to number, shape or size ratio in actual practice. The number, shape and size ratio are only a selective design. Its composition, arrangement, and form may be more complex.

Figure 1:
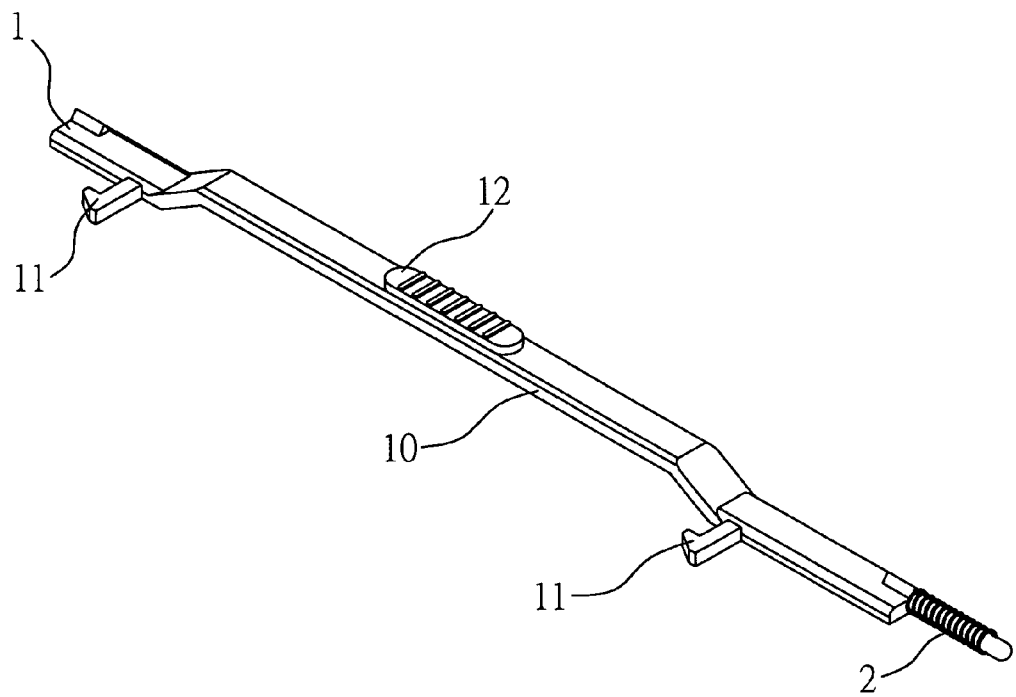
FIG. 1 is a schematic diagram of a latch device of a notebook computer according to the prior art.
Figure 2:
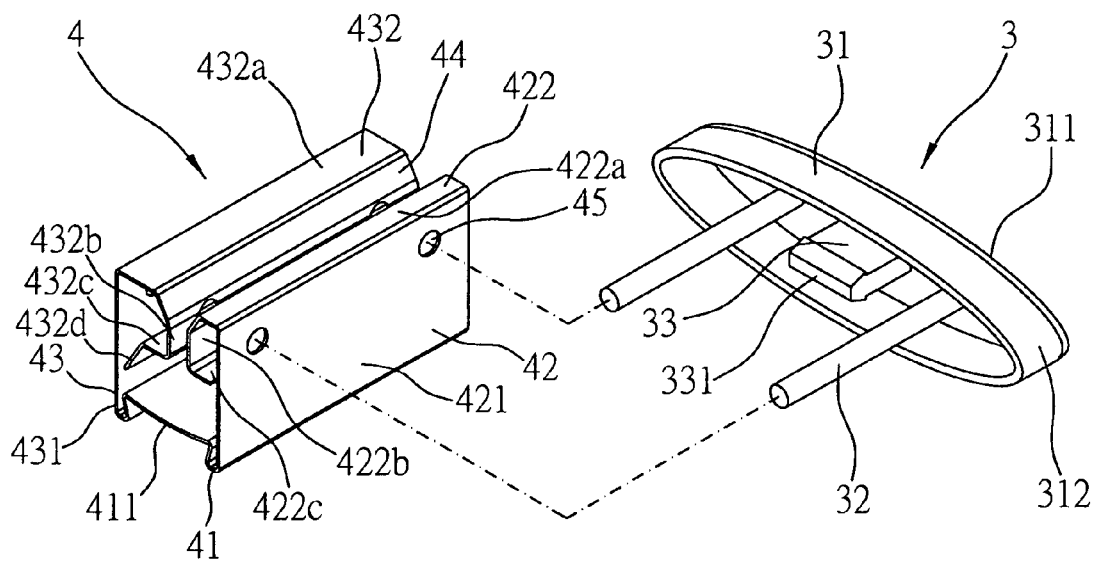
FIG. 2 is an explosive view of a press-type latch device of a first embodiment according to the present invention.
Figure 3:
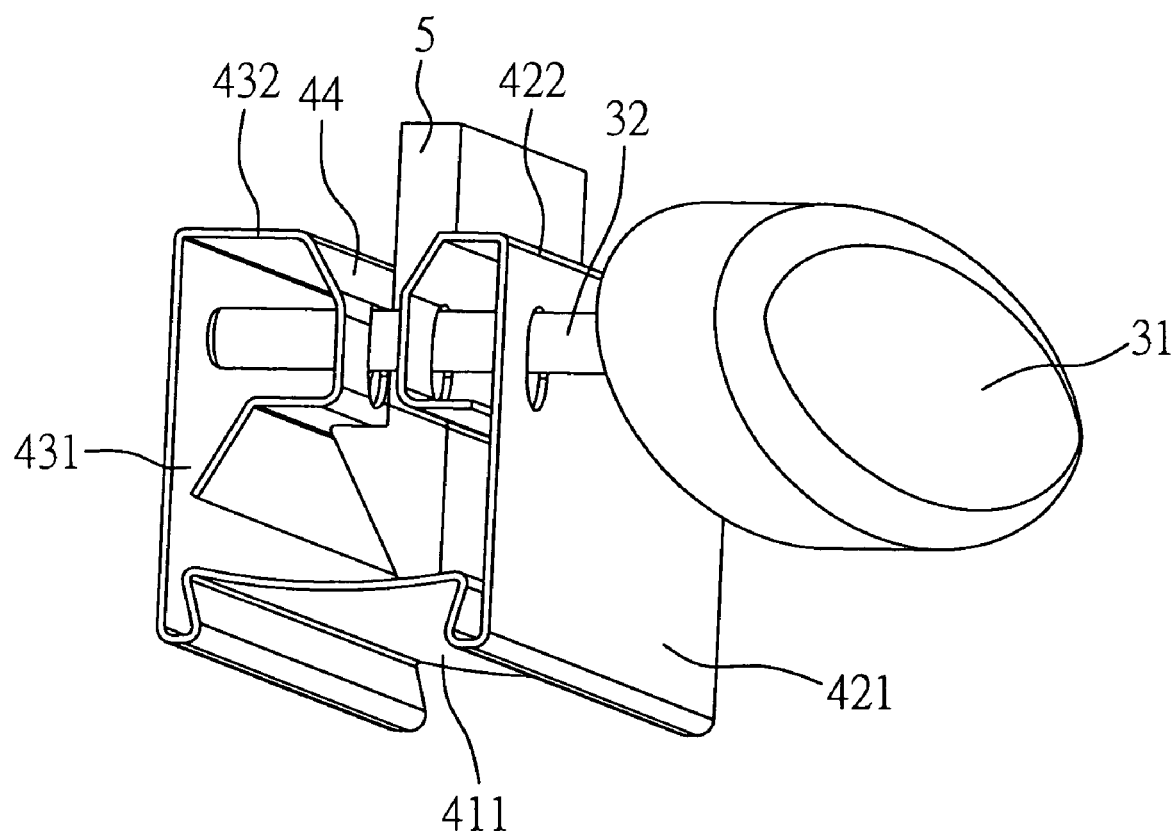
FIG. 3 is an assembled view of a press-type latch device of the first embodiment according to the present invention.

FIGS. 2 and 3 particularly show the structure of a press-type latch device applied to a notebook computer of the present invention. As shown in the drawings, the latch device of the present invention comprises a press member 3 and a spring member 4. The press member 3 is formed as an integrated whole of an insulating material, and the spring member 4 is formed of a metal plate with high elasticity by a stamping operation. But the spring member 4 is not restricted to the metal plate, any non-metal plate or sheet having enough strength, durability, and elasticity could be used.

The press member 3 comprises a substantially elliptical press portion 31, at least a connection portion 32, and at least a positioning portion 33. The press portion 31 comprises a face portion 311 provided for users to operate and a ring portion 312 cooperating with a notebook computer case so that the press member 3 glides smoothly. Substantially in the shape of a rod, the one or more connection portions 32 located inside the ring portion 312 extend from the face portion 311 of the press portion 31. The positioning portion 33 is also located inside the ring portion 312 of the press portion 31 and extends from the face portion 311 in the same direction as the one or more connection portions 32 from the face portion 311. A hook portion 331 is arranged at a front end of the positioning portion 33. The positioning portion 33 is used to fix the press member 3 on the notebook computer case.

The spring member 4 comprises: a bottom portion 41, and first and second latch arms 42 and 43. An upwardly convex spring release portion 411 is formed at the central area of the bottom portion. The first and second latch arms 42, 43 extend from two opposite sides of the bottom portion 41, the first, second latch arms 42, 43 respectively having first and second base portions 421, 431 extending vertically, and first and second engaging portions 422, 432 folding inward from upper edges of the first and second base portions 421, 431 and then extending downward. A latch space is formed between the first engaging portion 422 and the second engaging portion 432. The first engaging portion 422 generally has a U-shape with its opening toward the first base portion 421. The first engaging portion 422 comprises a first upper portion 422a, a first side portion 422b, and a first lower portion 422c. The shape of the second engaging portion 432 is similar to that of the first engaging portion 422, but the contour of the second engaging portion 432 is bigger than that of the first engaging portion 422. The second engaging portion 432 comprises a second upper portion 432a, a second side portion 432b, a second lower portion 432c, and an assisting portion 432d extending obliquely from the second lower portion 432c toward the second base portion 431. In addition, inclined surfaces (not designated) are formed on the first and second side portions 422b, 432b adjacent the corresponding first and second upper portions 422a, 432a to facilitate insertion of a hook 5 (shown in FIG. 4A) mounted inside the lid case of the notebook computer. Moreover, insertion holes 45 are respectively formed at suitable places through the first and second side portions 422b and 432b as well as the first base portion 421.

When assembling the press member 3 and the spring member 4 together, first, the spring member 4 is mounted at a suitable place inside the base of the case of the notebook computer. Thereafter, the press member 3 is mounted into the base of the case from outside the case, wherein the one or more connection portions 32 of the press member 3 are inserted into the insertion holes 45 of the spring member 4 with the free end of the one or more connection portions 32 abutting against the inside of the second base portion 431 of the spring member 4. The hook portion 331 of the positioning portion 33 hooks the corresponding portion on the base of the case to fix the press member 3 on the base of the case; the face portion 311 of the press portion 31 is exposed outside the base of the case for users to press, and the ring portion 312 cooperates with the base of the case such that the press member 3 can glide smoothly.

Figure 4A:
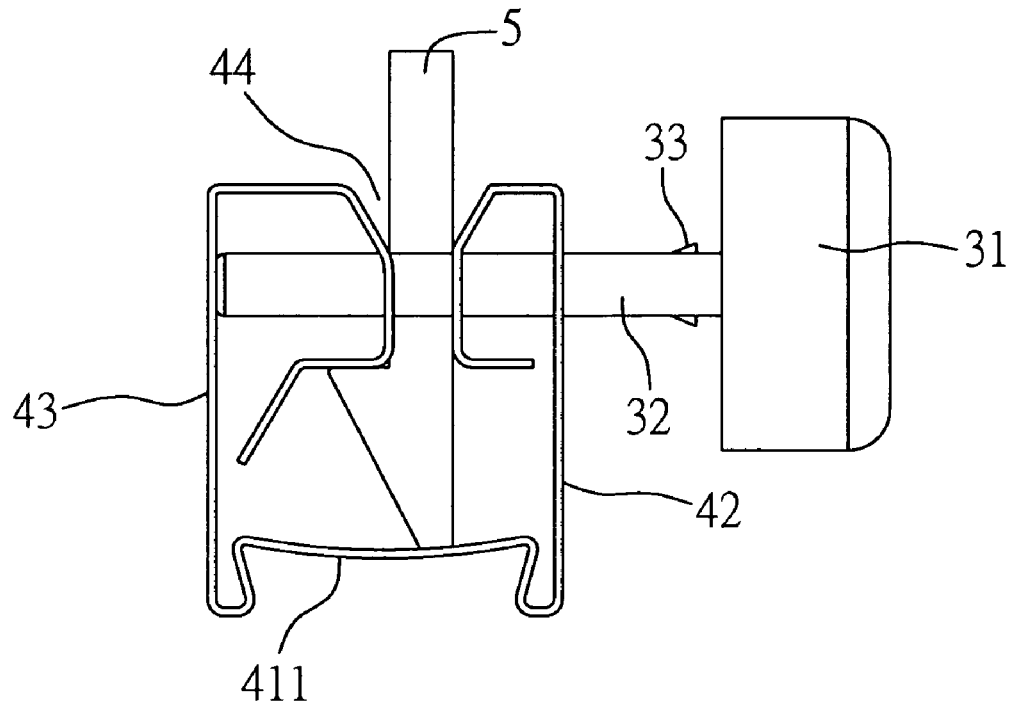
FIGS. 4A to 4C are cross sectional diagrams illustrating an unlatching process of a press-type latch device of the first embodiment according to the present invention.
Figure 4B:
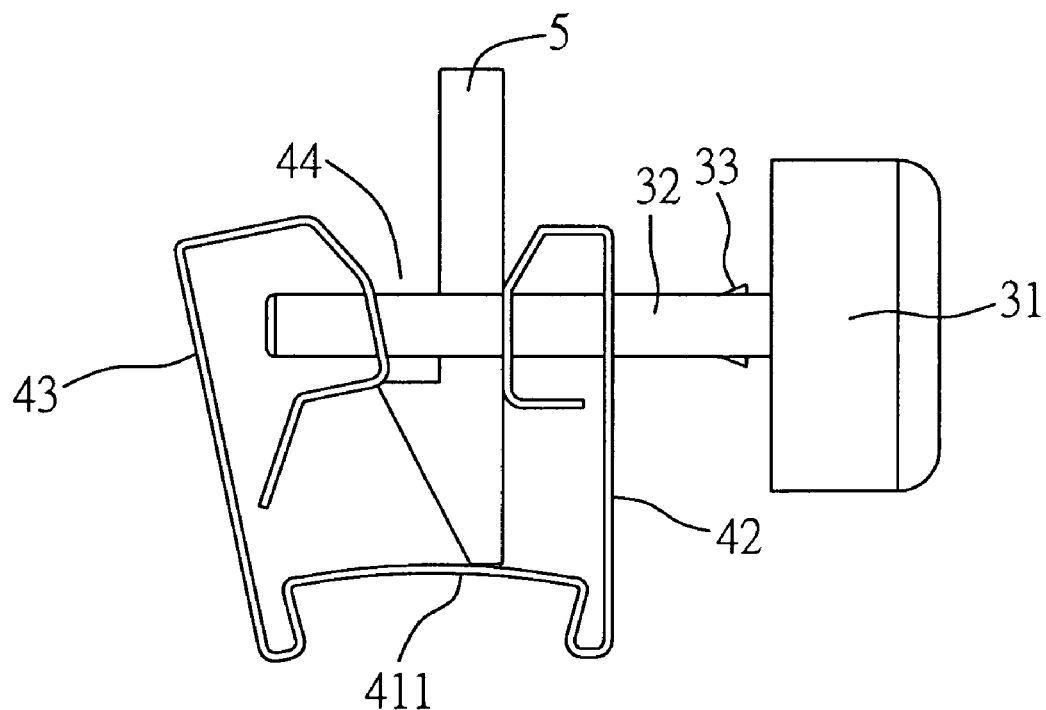
Figure 4C:
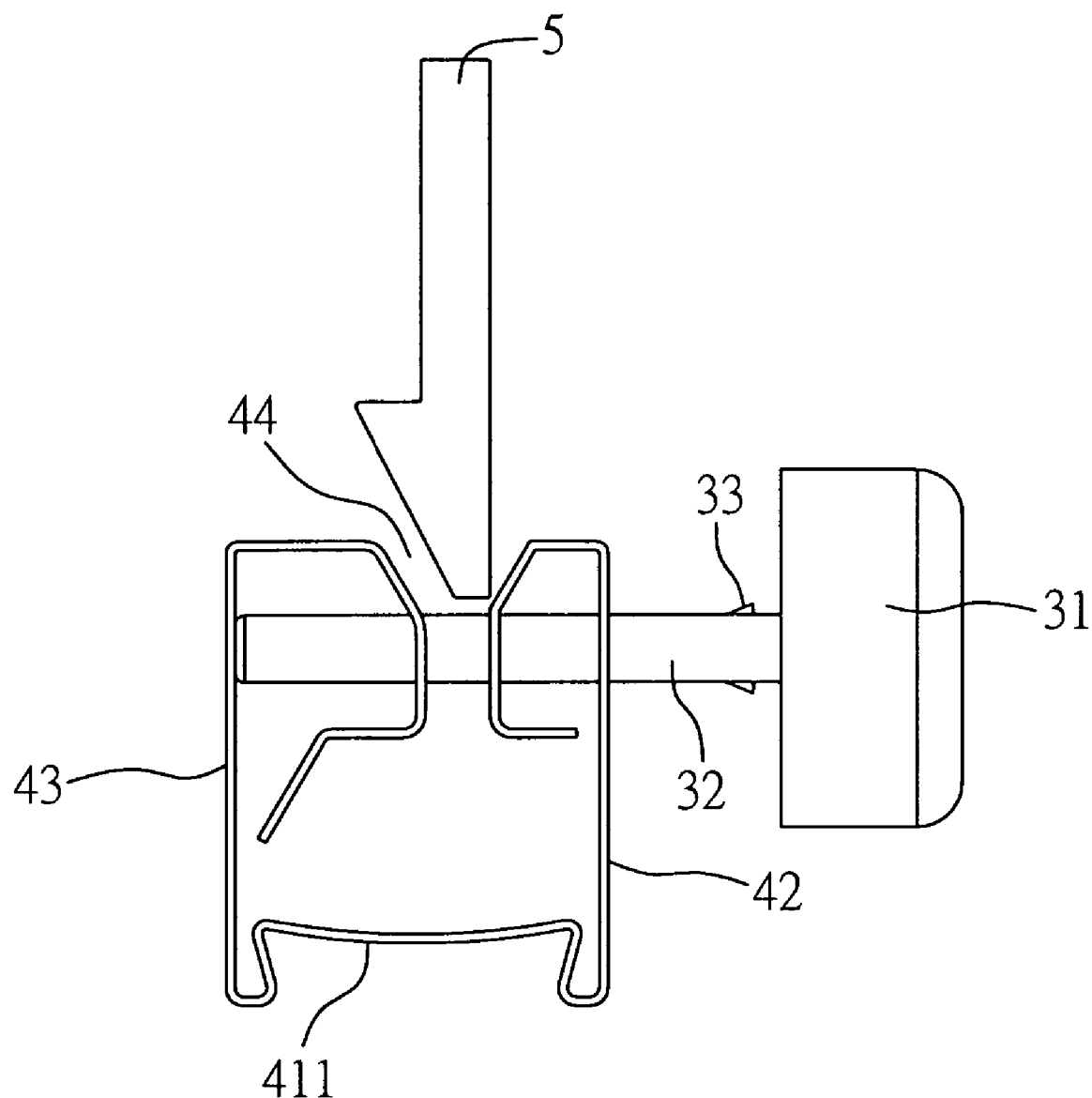

FIGS. 4A to 4C illustrate latching and unlatching processes for the press-type latch device of the present invention applied to a notebook computer.

While latching, the hook 5, mounted to the inside of the lid case, enters into the latch space 44 along the first and second side portions 422b, 432b and hooks the second lower portion 432c, thereby locking the lid.

On the other hand, to unlatch the latch, users press the above face portion 311 of the press member 3 to allow the free ends of the one or more connection portions 32 of the press member 3 to abut against the second latch arm 43 such that they cause inclination of the second latch arm 43 in a direction away from the first latch arm 42. With the resulting increase of the latch space 44, the hook 5 gradually leaves the second lower portion 432c of the spring member 4, thereby gradually releasing engagement between the hook 5 and the second lower portion 432c. At a certain releasing stage, the resilience of the release portion 411 of the bottom portion 41 acts to further push the hook 5 towards the opening of the latch space 44, thereby unlatching the latch effortlessly and quickly.

In other words, the press-type latch device, applicable to a notebook computer, includes: a press member having a press portion, at least a connection portion and at least a positioning portion extending from the press portion; and a spring member having a bottom portion and first and second latch arms extending in the same direction from the bottom portion, a latch space being formed between the first and second latch arms to allow a hook to enter into the latch space and engage with at least one latch arm, the spring member having insertion holes at least formed at suitable places of the first latch arm to allow the one or more connection portions of the press member to pass through the insertion holes of the first latch arm to abut against the second latch arm, wherein pressing the press portion causes the connection portion to incline the second latch arm of the spring member away from to the first latch arm, thereby increasing the latch space so as to disengage the hook from the engaged position.

Figure 5:
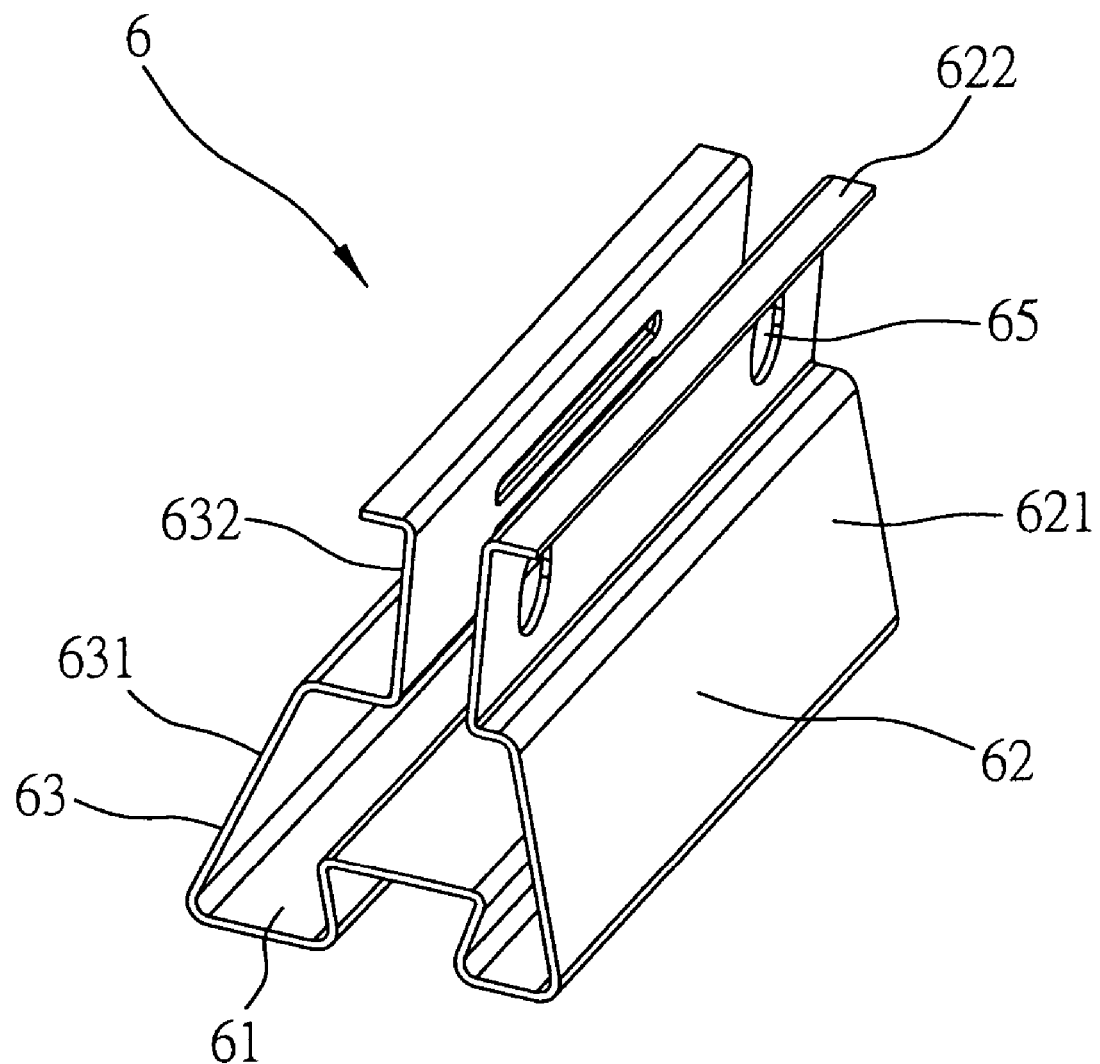
FIG. 5 is a schematic diagram of a press-type latch device of a second embodiment according to the present invention.

FIG. 5 is a stereograph of the spring member of the press-type latch device according to a second embodiment of the present invention.

The structure of the press-type latch device according to the present embodiment is similar to that of the first embodiment. The difference is that in the present embodiment, the first and second latch arms 62, 63 of the spring member 6 are modified, i.e. the first and second base portions 621, 631 extend obliquely upwards, and the first and second engaging portions 622 and 632 extend upwards respectively from upper edges of the corresponding first and second base portions 621, 631, and, at the same time, insertion holes 65 allowing penetration of the connecting portions 32 are only formed at suitable places of the first engaging portion 622.

Figure 6:
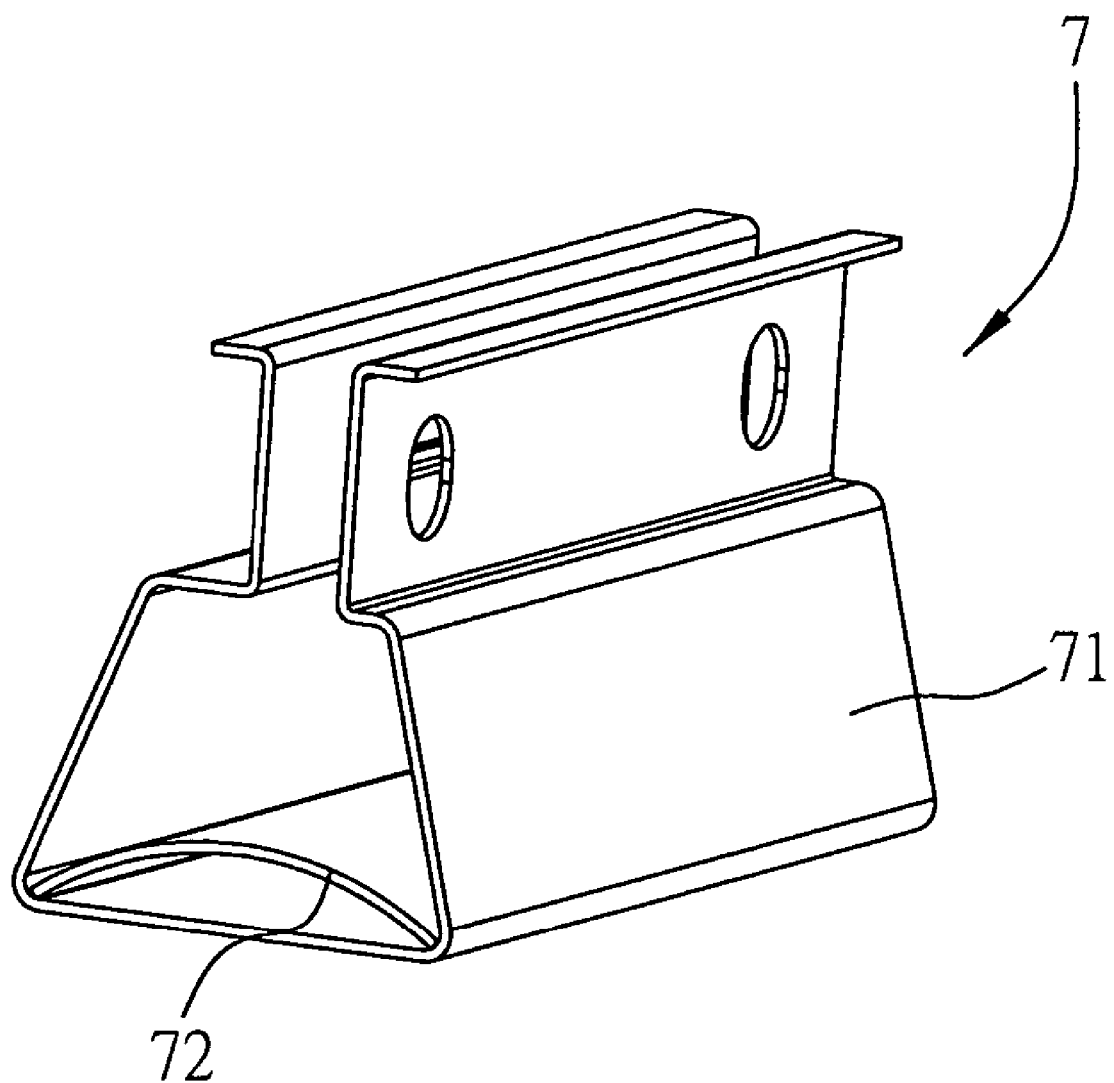
FIG. 6 is a schematic diagram of a press-type latch device of a third embodiment according to the present invention.

FIG. 6 is a stereograph of the spring member of the press-type latch device according to a third embodiment of the present invention.

The structure of the press-type latch device according to the present embodiment is similar to that of the first embodiment. The difference is that in the present embodiment, the spring member 7 is a two-piece structure including a first spring unit 71 and a second spring unit 72. The hook is unlatched by resilience of the second spring unit 72.

As a result, the press-type latch device according to all the above embodiments of the present invention can attain an unlatched state by using only one hand, thereby facilitating ease of operation and enhancing operability. Moreover, by pressing the latch device, the latch device is separated from the hook and the lid is opened at a certain angle to the base of the notebook computer, thereby making opening of the lid easier and labor-saving.

The above embodiments are only illustrative and no limitations are intended to the embodiments described heretofore. As such, various variations and modifications may be made without departing from the sprit and scope of the invention. Accordingly, the protection sought herein is set forth in the claims below.

What is claimed is:

1. A press-type latch device, which is used to establish latched and unlatched states in conjunction with a hook, the press-type latch device comprising:
   a press member having a press portion, at least one connection portions and at least a positioning portion extending from the press portion, wherein the connection portions and the positioning portion are each connected to the press portion without being directly connected with each other; and
   a spring member having a bottom portion, a first latch arm and a second latch arm, both of the first and second latch arms extending toward a same direction from the bottom portion, a latch space being formed between the first and second latch arms to allow the hook to enter into the latch space and engage with at least one of the latch arms, the spring member having at least one insertion holes at least formed at suitable places of the first latch arm to allow the at least one connection portions of the press member to pass through the at least one insertion holes of the first latch arm such that the at least one connection portions abut against the second latch arm, wherein pressing the press portion causes the at least one connection portions to incline the second latch arm of the spring member away from the first latch arm, thereby increasing the latch space so as to unlatch the hook engaged in the latch space.

2. The press-type latch device of claim 1, wherein the spring member further comprises a resilient release portion disposed at the bottom portion of the spring member, resilience of the release portion being able to push the hook toward an opening of the latch space.

3. The press-type latch device of claim 1, wherein spring member further comprises a resilient release portion, resilience of the release portion being able to move the hook toward an opening of the latch space.

4. The press-type latch device of claim 1, wherein the first latch arm and the second latch arm of the spring member comprise a first base portion and a second base portion, respectively, and a first engaging portion and a second engaging portion extending from the first base portion and the second base portion, respectively.

5. The press-type latch device of claim 4, wherein the first and second base portions extend in a vertical direction.

6. The press-type latch device of claim 4, wherein the first and second base portions extend obliquely upward.

7. The press-type latch device of claim 4, wherein the first and second engaging portions respectively extend upward from upper edges of the corresponding first and second base portions.

8. The press-type latch device of claim 4, wherein the first and second engaging portions respectively extend downward from upper edges of the corresponding first and second base portions.

9. The press-type latch device of claim 4, wherein the first and second engaging portions are in a U-shape.

10. The press-type latch device of claim 4, wherein the first and second engaging portions respectively comprise first and second upper portions, first and second side portions, and first and second lower portions.

11. The press-type latch device of claim 10, wherein the second engaging portion further comprises an assistive portion extending obliquely downward from the second lower portion.

12. The press-type latch device of claim 1, wherein the press portion of the press member further comprises a face portion and a ring portion.

13. The press-type latch device of claim 1, wherein the one or more connection portions of the press member are in the shape of a rod.

14. The press-type latch device of claim 1, wherein the one or more positioning portions and the one or more connection portions of the press member extend in a same direction and a hook portion is disposed at a front end of the positioning portion.

15. The press-type latch device of claim 1, wherein the spring member is formed of a metal plate with high elasticity by stamping.

16. The press-type latch device of claim 1, wherein the press member is formed as an integral whole of an insulating material.

* * * * *